United States Patent [19]
Heule

[11] 3,851,181
[45] Nov. 26, 1974

[54] BLOOD LEVEL DETECTOR

[75] Inventor: James E. Heule, Plymouth, Minn.

[73] Assignee: Audronics, Inc., Minneapolis, Minn.

[22] Filed: Nov. 7, 1973

[21] Appl. No.: 413,692

[52] U.S. Cl.......... 250/577, 128/214 E, 222/400.7, 340/239, 340/244
[51] Int. Cl. .......................................... G01n 21/26
[58] Field of Search............... 250/575, 576, 577; 23/258.5; 137/386, 392, 395; 222/373, 400.7; 128/214 C, 214 E, 214 F, DIG. 13; 340/244, 246, 239

[56] References Cited
UNITED STATES PATENTS

| | | | |
|---|---|---|---|
| 3,388,258 | 6/1968 | Grant | 250/577 |
| 3,596,673 | 8/1971 | Laucournet | 222/400.7 |
| 3,700,904 | 10/1972 | Stobble | 128/214 E |

Primary Examiner—James W. Lawrence
Assistant Examiner—D. C. Nelms

[57] ABSTRACT

Apparatus is described for monitoring the blood level in a blood oxygenator by means of light emitting elements projecting through a transparent wall of the oxygenator and light responsive elements receiving light reflected from the blood within the oxygenator. The apparatus detects drops in blood levels and generates suitable alarms in response thereto, including circuits for regulating the blood flow rate through the oxygenator, and circuits for detecting malfunctions of the inventive apparatus.

23 Claims, 8 Drawing Figures

BLOOD LEVEL DETECTOR

This invention relates to an electronic and optical apparatus for monitoring blood level in an oxygenator. The invention detects blood level and controls a blood pumping mechanism to correctively react whenever blood level drops below certain predetermined amounts.

The apparatus is designed primarily for use with an oxygenator of the type described in U.S. Pat. No. 3,488,158, D. J. Bentley et al. This patent describes a bubbler assembly and associated oxygenator having certain construction features which enable its use particularly with the present invention. However, the invention is adaptable for use with other variations of oxygenator which may be found in the medical practice.

BACKGROUND

Blood oxygenating apparatus is typically used in surgical operating procedures, and is necessary when blood has been removed from a patient and must be conditioned for recirculating through the patient's body. The oxygenating apparatus serves the function of introducing oxygen into the blood and removing carbon dioxide therefrom. For example, in the treatment of cardiovascular disease by surgical methods it is often found necessary to stop the normal functioning of the patient's heart and lungs for substantial periods of time, providing for extracorporeal circulation and oxygenation of the blood, so as to keep the patient alive during the operation and until the normal functioning of the heart and lungs can be restored. In a bubbling type oxygenating apparatus the blood is removed from the patient and passed through a device which injects oxygen bubbles into the blood, usually by first creating a thin flowing layer or film of blood, and then collecting the oxygenated blood for recirculation into the patient. Although it is crucial that oxygen be provided to the blood in this manner, it is critical that no oxygen bubbles pass back into the patient's arteries, for if this occurs death almost immediately results. Accordingly, in an oxygenating apparatus of the type described herein it is of crucial significance that a constant flow rate of blood pass through the oxygenator, and that the device be immediately stopped in the event that blood flow rate drops to the point where there is danger of injecting air bubbles into the patient's arteries.

The Bentley bubble-type oxygenator described in the aforementioned patent is comprised of three primary chambers: a cylindrical oxygenating chamber, a narrow central chamber, and a lower cylindrical heat exchanging chamber. In use, the blood flows first through the oxygenating chamber, and then through the very narrow central chamber into the heat exchanging chamber. A fourth chamber for collection of blood and recirculation into the patient is also used. This last chamber connects via suitable hoses to a blood pumping device which is attached to the patient to maintain the flow rate necessary. Each of the chambers are usually formed from a polycarbonate plastic which is transparent. The plastic is inert, non-toxic, and impervious to the passage of gases and liquids. The plastic has a fairly consistent transparency, which enables the use of light transmitting devices in conjunction with the present invention.

The present invention is preferably used in connection with the bubble-type oxygenator's narrow central chamber, wherein blood flow is maintained across a sheet-like passage. This chamber acts as a blood reservoir collecting the output from the oxygenating chamber and holding it at some predetermined level or levels, while the heat exchanging chamber is processing previously collected blood. The design of the oxygenating device is such that blood flowing into the narrow central chamber is very smoothly transitioned, without any bubbling or dripping. Therefore, the blood level within the narrow central chamber is always fairly precisely defined by a smooth line at the blood level surface.

SUMMARY OF THE INVENTION

Briefly, the invention comprises optical sensing means attached to a blood oxygenator central chamber, at a point or points corresponding to safe blood levels within the oxygenator, but below which the blood level requires some corrective action in either adjusting the flow rate or stopping the flow rate through the oxygenator to the patient's blood supply. Since the oxygenator is made from transparent plastic the optical sensing means is able to receive reflected light from the blood flowing within the oxygenator chamber. The invention further comprises an electronic circuit for appropriately amplifying the sensed signals and monitoring the signals over a period of time. The circuit includes means for storing an initializing signal representative of a safe blood level and it continuously compares the instantaneous oxygenator blood level signal with this initializing signal. The invention detects drops in blood level at three points, and generates appropriate corrective action corresponding to the degree of hazard associated with the respective blood levels. In a first stage of detection, wherein a drop in blood level is cause for concern but falls within a "safety" zone of operation, the invention generates an audible and visual alarm to enable an attendant to make minor adjustments to the equipment. In a second stage of operation, corresponding to a blood level which has dropped further and requires corrective action, the invention generates a second alarm and further, automatically adjusts the oxygenator flow rate into the patient's arteries, allowing the input blood flow to the oxygenator to return to a normal level. In a third stage of operation the invention senses a further drop in blood level corresponding to an impending serious problem, and a further alarm is activated and the invention automatically discontinues further blood flow from the oxygenator to the patient to avoid the possibility of air bubbles from entering the patient's arteries. The invention further comprises circuitry for detecting an internal malfunction and it generates suitable indications to enable corrective action to be taken.

The primary object of the present invention is to provide a means for monitoring the blood level in the oxygenator's central chamber for detecting variations in said blood level. Another object is to provide a means for controlling the blood flow rate from the oxygenator as a function of blood level as detected in the central chamber.

A further object of the invention is to provide a means for generating an alarm signal when blood level drops below certain predetermined minimums. Yet another object of the invention is to provide an apparatus for monitoring blood level of an oxygenator in an operating room environment in a manner which enables the apparatus to be quickly set up and calibrated, and which thereafter will monitor blood level and provide a self-checking feature for certain potential internal malfunctions in the apparatus.

Finally, an object of the invention is to generate suitable alarm means in the event the inventive apparatus itself malfunctions.

A preferred embodiment of the invention is illustrated in the accompanying drawings in which.

DETAILED DESCRIPTION

Figure 1:
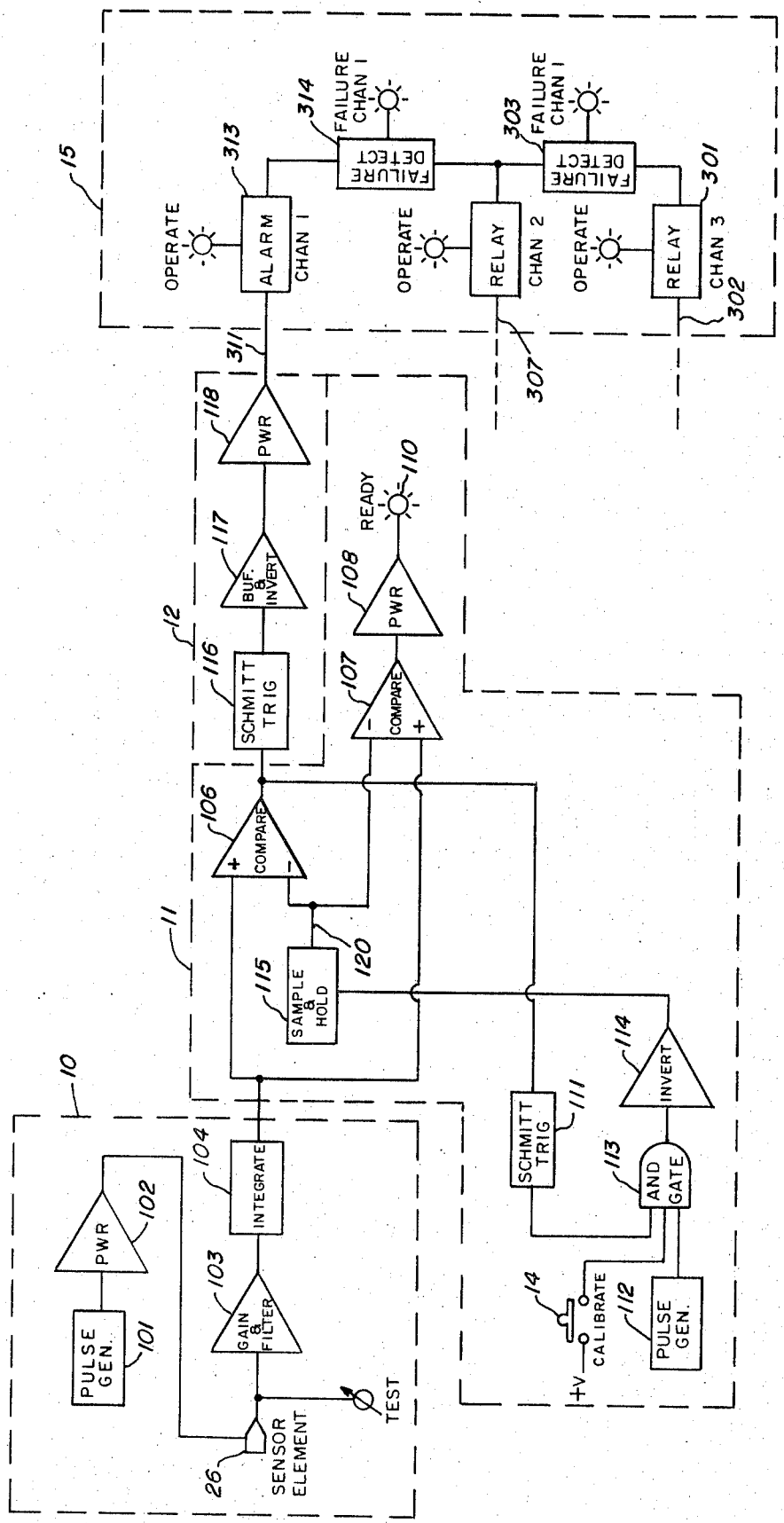
FIG. 1 illustrates, in block diagram form, the inventive apparatus.

FIG. 1 illustrates in block diagram form a portion of the electronic apparatus associated with the invention. There are three optical sensing elements associated with this invention, and each of them is connected to a suitable electronic circuit to accomplish the functions which provide the technical advantage and effect of this invention. A sensor drive circuit is associated with each sensor; FIG. 1 illustrates circuit 10 in connection with sensor 26. The drive circuits used with each of the other sensors are identically constructed to circuit 10. Likewise, the sensor signal receiving and threshold circuits 11 associated with sensor 26 are illustrated in FIG. 1. The circuit 11 receive the signal from the sensor drive circuit and compare it with some predetermined threshold value. When the comparison indicates a signal divergence form the threshold, circuits 12 generate a signal for activating a suitable alarm means 15. Included within alarm means 15 are the appropriate alarm elements for each of the other sensors. The operation of each of the elements within each of their respective boxes illustrated in FIG. 1 will be explained in detail hereinafter.

Sensor 26 includes a light transmitted device and an optical receiving device for receiving light reflected from the blood within the central chamber 21 of the oxygenator. When the blood level exceeds the mounting position of sensor 26 it generates a voltage output. This voltage output is amplified, filtered and integrated to provide a DC signal into a compartor circuit. The compartor circuit has previously been calibrated, by means of a sample and hold circuit to be explained hereafter, to generate a predetermined voltage output whenever blood level is sufficient. However, when the blood level drops, the output of sensor 26 changes and subsequently the voltage output of the comparator circuit changes. This output is fed into a Schmidt trigger circuit to activate said trigger and cause a signal to be generated to an alarm. In the case of sensor 26, associated with blood level 27 of FIG. 2a, the alarm signal causes the activation of a warning light and an audible alarm.

Figure 2A:
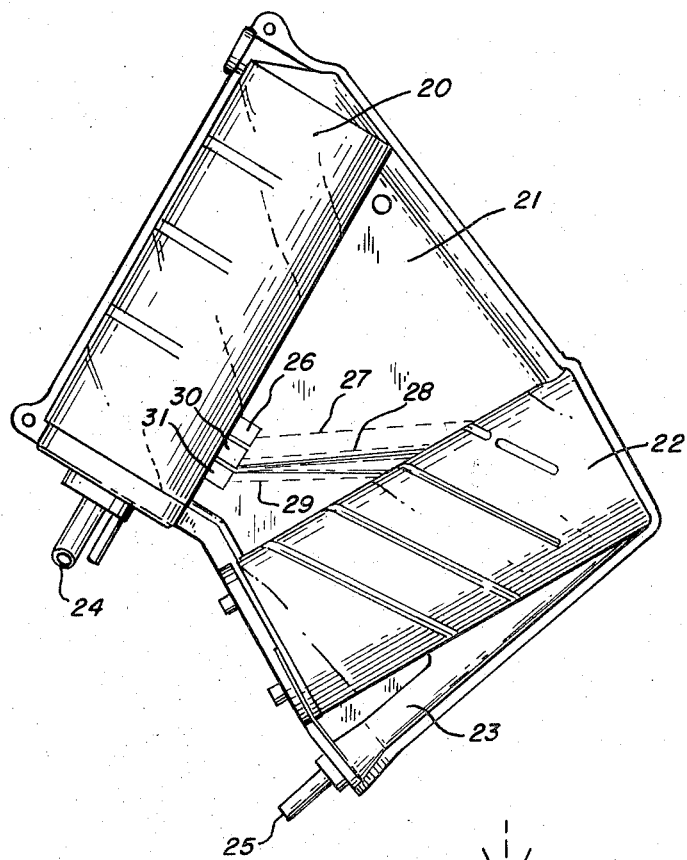
FIGS. 2A and 2B illustrate the sensors of this invention in an operating position on a bubble-type oxygenator, and illustrate the oxygenator configuration.

In connection with the sensors associated with blood levels 28 and 29 of FIG. 2A, the alarm means, when activated, regulate the blood pumping apparatus which pumps blood from the oxygenator to control the blood flow rate back into the patient's arterial system.

Sensor drive circuits 10 generate the voltage signals for driving light-emitting diodes located within each of the sensors. They also contain the circuits for receiving the reflected light signals from the blood and converting same into electrical signals, amplifying and filtering them, and integrating them into a direct current signal representative of the light received by the sensor and correspondingly representative of the blood level which the sensor monitors.

Circuits 11 receive the integrated direct current output signal from circuits 10 and compare this signal with a prestored signal representative of the initial blood level in the oxygenator. Included within circuits 11 are circuits for initializing the prestored signal element, including both a manual and automatic means for accomplishing this purpose. The initializing circuits include a signaling device for indication that proper calibration has been accomplished. The output from circuits 11 is a voltage representative of the difference between a "safe" blood level and the instantaneous blood level.

The output from the comparator of circuits 11 is fed into circuits 12, which includes a trigger circuit for developing a trigger voltage whenever the comparison signal deviates from a predetermined value. This trigger is fed into suitable amplifiers for providing a drive signal to activate one or more alarms.

The alarm drive signal from circuits 12 is fed into alarm circuits 15. Alarm circuits 15 include all of the audible and visual alarms used with the invention. It is to be emphasized that, associated with each sensor on the oxygenator is an independent interconnected series of circuits 10, 11, and 12; whereas each of these independent "channels" are connected into alarm circuits 15. The alarm developed by circuits 15 for a signal received on channel 1, corresponding to a highest zone blood level, comprises an audible and visual alarm. The alarm means developed for channel 2, corresponding middle blood level zone, comprises an audible and visual alarm, and a switching circuit for slowing the blood flow rate from the oxygenator back into the patient. The alarm circuit means developed for channel 3, corresponding to the lowest blood level zone, comprises an audible and visual alram, and switching circuit means for shutting off the blood flow from the oxygenator back into the patient. In addition, alarm circuits 15 include certain detectors for monitoring the operation of the invention and for generating suitable alarms whenever the invention itself malfunctions. A detailed description of these alarm circuits will be made hereinafter.

The invention requires a suitable low voltage power supply, typically a regulated voltage of approximately 15 volts for operating the various semiconductor circuits described herein. Additionally, the invention requires a voltage for driving the alarms and indicators; this voltage may be unregulated at, for example, 22 volts. The voltage power supply for supplying these voltages may be any of a number of commonly known and available power sources.

OXYGENATOR APPARATUS

FIG. 2A illustrates an oxygenator of the type used with the present invention. The oxygenator comprises a bubble chamber 20, a narrow central chamber 21, a lower cylindrical heat exchanging chamber 22, and a collecting chamber 23. When in normal operation, the angle formed by the axis, of the bubble chamber 20 is preferably within the range of approximately 35° to 50° relative to horizontal. The oxygenator has a blood inlet 24 which is connected to the patient's veins for passing blood from the patient to the oxygenator. A blood outlet 25 is connected to a suitable hose, and blood is passed therefrom back into the patient's arterial system via a suitable blood pumping means. In operation, blood enters inlet 24 into bubble chamber 20, where it is oxygenated and carbon dioxide is removed therefrom. A complex combination of filters and passageways is used for this purpose. Thereafter the blood flows across the narrow central chamber 21 into the heat exchanging chamber 22, where temperature adjusting means is provided. The blood is then collected into collecting chamber 23 and passed back into the patient.

Figure 2B:
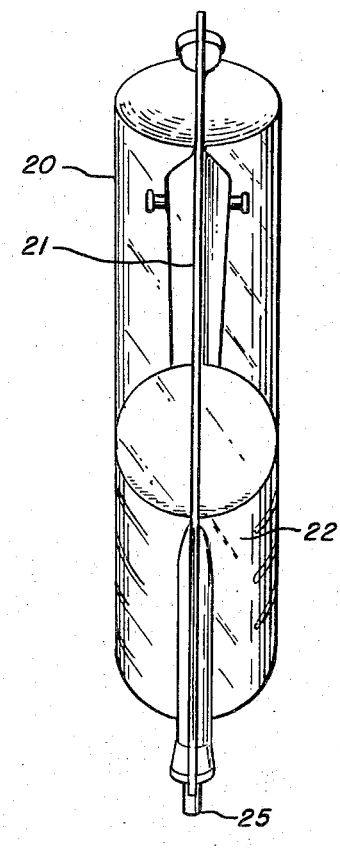

FIG. 2B illustrates the oxygenator of FIG. 2A in side view. From this figure it can be seen that chambers 21 and 22 are cylindrical, whereas central chamber 21 is very narrow. Since the apparatus is constructed from transparent plastic material, including central chamber 21, it is possible to see through the outer walls of chamber 21 and to determine the level of blood flowing therethrough. For example, dotted lines 27, 28, and 29 indicate several relative blood levels illustrative of the flow of blood through the central chamber 21.

Attached to the side of central chamber 21 is optical sensor 26, to be described in more detail hereafter. Sensor 26 is positioned to monitor variations in the blood level indicated approximately by dotted line 27. Positioned below sensor 26, at a relatively lower blood level line, is a second sensor 30, and positioned still lower is a third sensor 31. Sensors 30 and 31 contain suitable optical sensing means for monitoring lower levels of blood, as indicated by dotted lines 28 and 29. When the oxygenator is being used in a typical operating room surgical procedure the preferable blood level passing therethrough lies in the range indicated above dotted line 27. When the blood level drops below line 27 sensor 26 generates a voltage signal which continues until the blood level returns to a level above sensor 26. Likewise, when the blood level drops below line 28 and 29, sensors 30 and 31 respectively generate voltage signals. The respective sensor voltage signals are each independently processed in the invention through separate channels of circuitry. For purposes of explanation only the circuitry associated with the processing of signals from sensor 26 will be referred to herein as channel 1 circuitry; the circuitry associated with sensor 30 will be referred to as channel 2 circuitry; the circuitry associated with sensor 31 will be referred to as channel 3 circuitry.

SENSOR CONSTRUCTION

Figure 3:
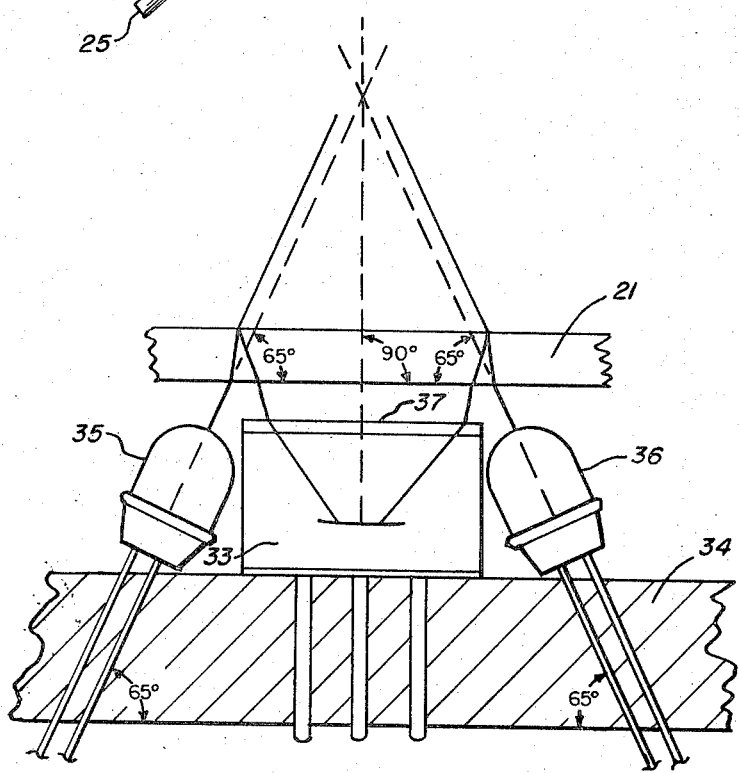
FIG. 3 illustrates the optical sensing means used in conjunction with the invention.

FIG. 3 illustrates the geometric layout of a sensor usable with the invention. Elements 35 and 36 are light emitting diodes, typically Monsanto type ME 60. These diodes are physically mounted in a holder at an angle of 65° ± 5° relative to the surface of the oxygenator chamber 21. Positioned intermediate the diodes 35 and 36 is a light responsive semiconductor element 33, typically a Fairchild semiconductor type FPT 130. Element 33 is responsive to light received through its surface 37 generates an electrical signal proportional to the light intensity received therethrough.

EAch of the components 35, 36, and 33 are mounted on a printed circuit board 34 with their electrical connecting leads passing through circuit board 34 for external connections. The entire assembly is preferably formed into a solid epoxy block to provide structural rigidity and to preserve the relative positons of the elements.

SENSOR DRIVE CIRCUITS

Figure 4:
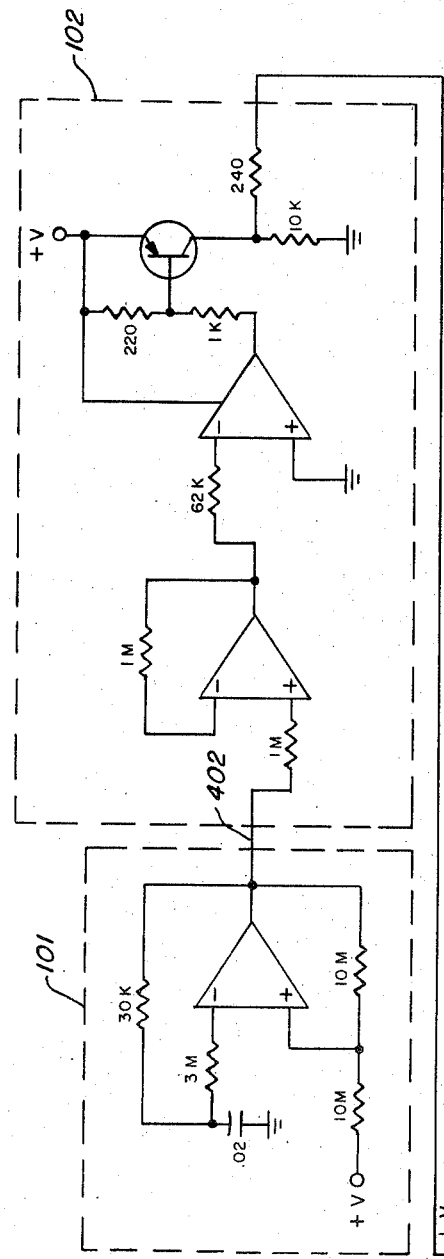
FIG. 4 illustrates the electronic circuit embodiment for activating the sensing means.
Figure 4:
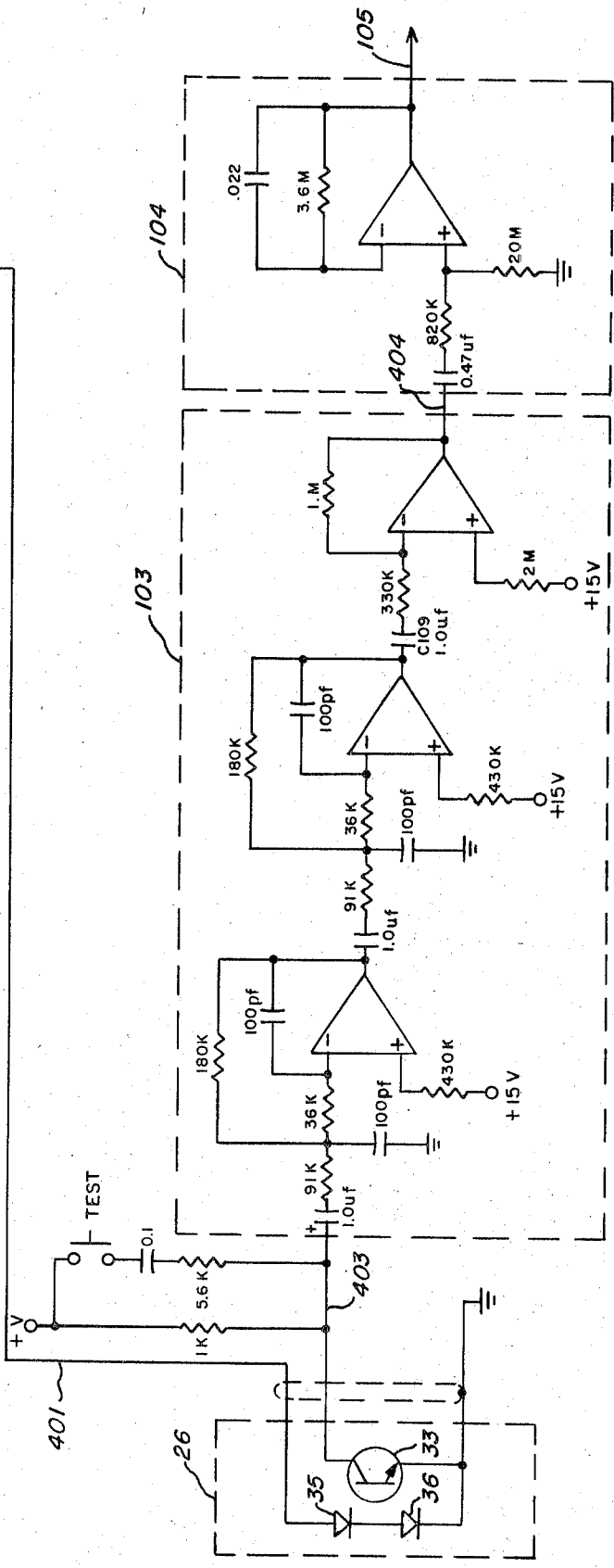

FIG. 4 illustrates the detailed electronic circuitry associated with sensor drive circuits 10 as illustrated in FIG. 1. In this figure and subsequent figures the circuits represented as triangles are portions of integrated circuit packages. Any of a number of well known commercially available integrated circuits may be used having therein several operational amplifiers. For example, the operational amplifier integrated circuit Type MC3401P, manufactured by Motorola, or the Type LM3900 Quad amplifier, available from National Semiconductor Crop, may be used in this circuit application. Typically, a single integrated circuit package such as either of those described above has several operational amplifiers. Therefore, the circuitry represented in FIG. 4 may be packaged in a very small volume.

Each of the resistors, capacitors, transistors, and diodes illustrated in FIG. 4 and subsequent figures are illustrated with their preferred component values adjacent the respective symbols in the conventional engineering manner. Variations from these values may be made within the spirit of the invention, although it has been found that satisfactory operation of the invention is obtained with these values. The circuitry shown in FIG. 4 is described with reference to channel 1; it is understood that the comparable circuits associated with channels 2 and 3 are identical to the channel 1 circuits.

Light-emitting diodes 35 and 36 are connected in series within sensor 26. One of their output wires is connected to ground, and the other is connected to line 401, which is the output connection from circuit 102. Circuit 102 comprises a power amplifier circuit, and serves to amplify the input signal on line 402 to a power level sufficient to drive light-emitting diodes 35 and 36. Line 402 is in turn driven by circuit 101 which, in the configuration shown, operates as a pulse generator. With the component values illustrated in FIG. 4 pulse generator 101 generates an output signal at a frequency of 1,000 hertz (hz) which is amplified by circuits 102 and connected to the series combination of light-emitting diodes 35 and 36. The light-emitting diodes therefore flash on and off at a 1,000 hz rate. Light from these diodes is emitted inwardly through the wall of the blood oxygenator chamber as hereinbefore described, and a portion thereof is reflected back from the blood within said chamber to be received by light responsive element 33. This light has essentially two components: a component caused by ambient light in the operating room environment which is of fixed level, but which may vary slowly over time, and the 1,000 hz. light reflection, from the light-emitting diodes. These diodes are selected because of their characteristics in producing light in the infra-red range, approximately 9,000 Angstroms, which is a light wave length usually not found in an operating room environment. Also, because the light source turns on and off at a 1,000 hz. frequency, the apparatus is easily able to distinguish the reflected light frequency from any other flashing lights which may be found in the area. In this manner the invention is able to discriminate between ordinary background light and the light generated by the diodes.

The 1,000 hz. electrical signal from the semiconductor 33 is fed to circuits 103 via line 403. Circuits 103 serve as an amplifier and filter — to strengthen the signal output from 33 and also to filter the inherent noise which exists in the optical and electrical circuit elements. For example, electro cauterizing equipment used for closing blood vessels during a surgical procedure by applying an electric arc generates a tremendous amount of electrical noise in the frequency range 100 Khz. – 3 Mhz. The low-pass filters in circuits 103 serve to eliminate this and other high-frequency noise signals. The output of amplifier 103 is fed via line 404 to entegrator 104. This circuit integrates or smooths the peak values of the 1,000 hz. signal and generates at its output 105 a varying d.c. signal whose amplitude depends upon the averaged peak amplitudes of the received 1,000 hz. signal.

A "test" circuit is provided at the output of the sensor light responsive element. This "test" circuit attenuates the sensor output signal to about 60 percent of its normal value, simulating a drop in blood level. Therefore, by depressing the "test" pushbutton the operator can check the appropriate warning lights to insure that the apparatus is functioning properly.

RECEIVING AND THRESHOLD CIRCUITS

Figure 5:
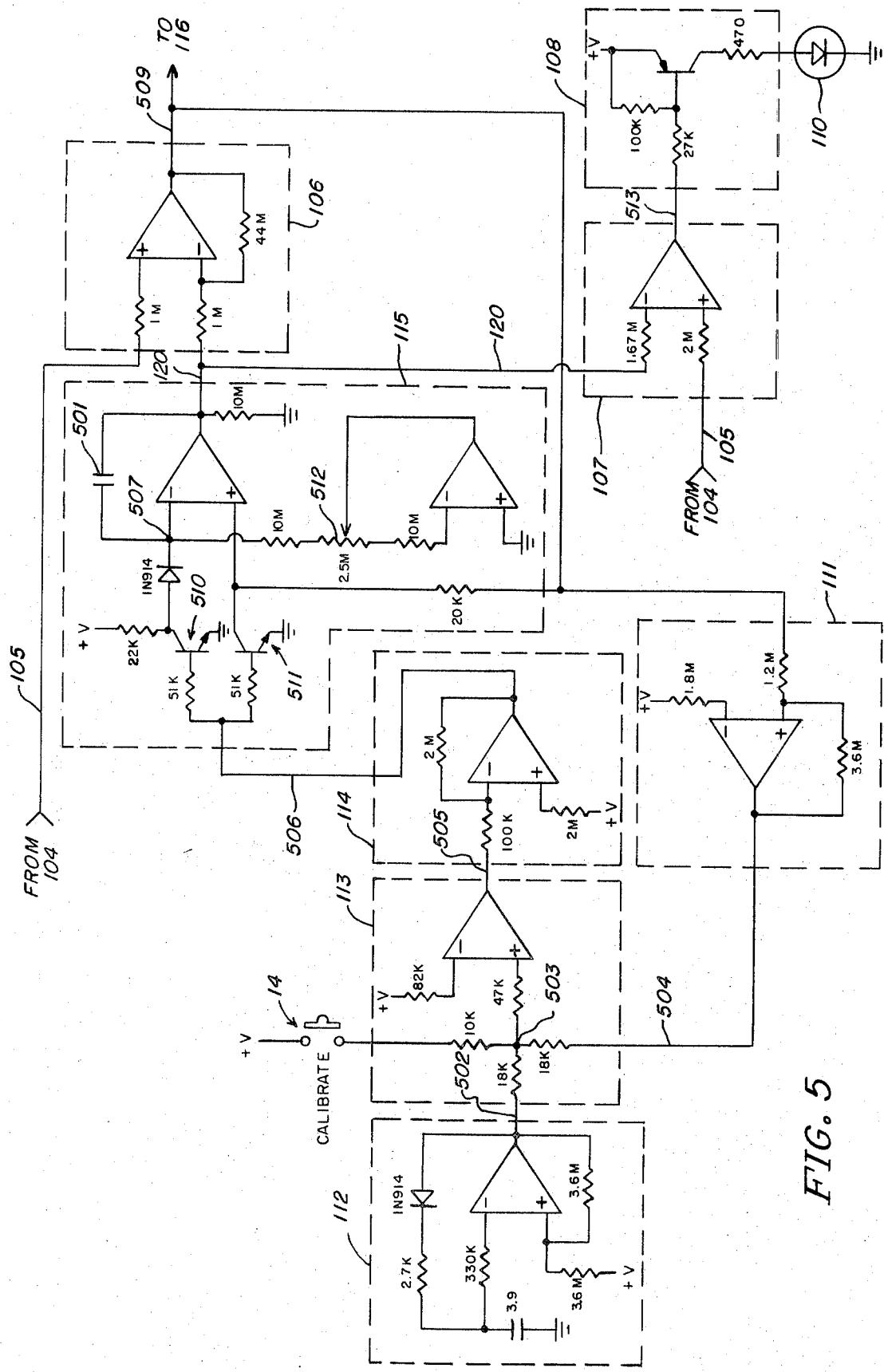
FIG. 5 shows the receiving and threshhold circuits.

The signal of time-varying amplitude received via line 105 by comparator 106 (FIG. 5) is compared against a baseline voltage representative of a satsifactory blood level within the oxygenator central chamber. The baseline signal is generated by the circuits generally designated within FIG. 1 as circuits 11. In particular, the baseline signal is fed into the comparator 106 via its input line 120. The signal on line 120 is equal in magnitude to the stored voltage charge on capacitor 501, which functions as a sample-and-hold capacitor. The voltage stored on capacitor 501 discharges very slowly, the RC time constant being greater than 1 second, and the associated circuitry provides a charging voltage to the capacitor 501 at approximately the same rate as the capacitor is discharged. Thus, after the capacitor 501 is approximately charged to the baseline level, the sample-and-hold circuitry tends to maintain it in the same voltage charge condition so that it may serve as a baseline voltage for comparison against the signal on line 105.

The voltage charging of capacitor 501 is accomplished by means of circuits 111, 112, and 114. Circuit 112 functions as a pulse generator, generating pulses at a frequency of approximately one pulse per second (pps.). These signals are fed via line 502 to circuit 113, which functions as a modified AND gate. The one pps. signal is combined at AND junction 503 with two other signal sources; one of these, a d.c. input signal which is present when pushbutton 14 is depressed, will be described hereafter. The other signal into AND junction 503 is from threshold amplifier 111 via line 504. Under normal blood level conditions the output signal on line 504 provides a positive voltage at junction 503 sufficient to enable the input of the amplifier in AND gate 113 to receive signals from line 502 at one pps. Therefore, a one pps. output signal is generated on line 505, which feeds the input to inverting amplifier 114. Thereafter, a one pps. signal is conducted over line 506 to the input of sample-and-hold circuit 115. Specifically, the signal online 506 causes transistor 510 and 511 to cut off for a brief period of time, approximately one millisecond, during each one second interval. When transistor 510 cuts off it causes a voltage charge increment to be coupled into capacitor 501 through diode 1N914, which serves to replace any storage voltage charge drained off during the previous one second time interval. Transistor 511 provides another amplifier input and serves to stabilize the amplifier output.

A fine calibration exists for correcting the incremental capacitor voltage charge, via the circuits associated with potentiometer 512. Potentiometer 512 provides a variable input d.c. bias to the operational amplifier associated with capacitor 501, thereby providing a means for regulating the current at junction 507. The potentiometer provides a fine calibration which serves to compensate for long-term drift that would otherwise tend to affect the voltage charge on sample-and-hold capacitor 501.

The baseline voltage on storage capacitor 501 is fed via line 120 into the input of comparator circuit 106, the other input being received via line 105 from the sensor signal integrator 104. As long as the blood level in the oxygenator remains adequate these two signals are equal and the output of comparator 106 remains constant. In the event that background illumination changes, or noise become introduced into the circuits, or blood level begins to vary slightly, the two input signals to comparator 106 become unequal and the output signal on line 509 changes. This output is fed back to the input of threshold switching circuit 111, which circuit is responsive to very small (millivolt) changes in the quiescent signal present on line 509. As soon as the threshold level is reached circuit 111 switches, removing the voltage at its output line 504. This causes the voltage at junction point 503 to drop and disables any further signals from pulse generator 112. The AND gate circuit 113 removes the drive signal on line 506 and the one pps. drive signals to transistors 510 and 511 are removed. This causes no further charge increment to be added to capacitor 501. The purpose of this feedback network is to provide a means for the circuit to recognize small variations in the output of comparator 106, which variations are due substantially to noise, and to prevent such variations from affecting the voltage charge stored on sample-and-hold capacitor 501. Therefore the circuit is insensitive to small voltage variations and is to that extent noise immune.

During initial startup the sample-and-hold capacitor 501 becomes self-charged automatically. Initially the signal on line 105 is representative of a normal blood level (assuming the blood level in the oxygenator is proper) and the signal on line 120 is representative of a very low blood level (since the capacitor 501 is discharged). The relative signals on lines 105 and 120 cause the output signal voltage of comparator 106 to go positive, which signal voltage is fed to the input of trigger circuit 111. Trigger circuit 111 is insensitive to positive voltage signals of this type and, as a result, no trigger signal is generated. Therefore, the AND gate 113 remains enabled and pulses generated by pulse generator 112 are coupled to the sample-and-hold circuit to incrementally charge capacitor 501. Eventually, capacitor 501 becomes fully charged and the signals on lines 105 and 120 become equal, and the output of comparator 106 stays positive. Subsequently, any drop in oxygenator blood level will cause the signal on line 105 to likewise drop (relative to the signal on line 120), causing comparator 106 output to go negative. Since the comparator 106 output goes negative in this instance, trigger circuit 111 generates a trigger signal because of the circuit 111 sensitivity to negative signals.

A manual means for initially charging capacitor 501 is also a part of the invention. Pushbutton 14 provides this manual charging function. Assuming capacitor 501 to be initially uncharged when the apparatus is first activated, it is desirable to provide a means for quickly placing the proper voltage charge on capacitor 501 so that the invention may be immediately placed into operation. Pushbutton 14 may be depressed by the operator, placing a positive potential at junction point 503 and overriding the effects of pulse generator 112. This positive voltage at junction 503 is amplified as hereinbefore described, and results in the cut off of transistors 510 and 511. These transistors remain cut off for so long as pushbutton 14 is depressed, charging capacitor 501 at a rapid rate. A further circuit is used in conjunction with the manual charging means, to give the operator an indication when the pushbutton 14 should be released. This further circuitry is illustrated as circuits 107 and 108. Circuit 107 is a comparator which receives its inputs from line 120 and 105. These input lines are the same inputs as received by comparator 106. The output of comparator 107 is conducted over its output line 513 and drives a power amplifier 108, which in turn activates a light emitting diode 110. This diode turns on whenever the voltages at lines 105 and 120 are equal and indicates a "ready" condition, i.e., the sample-and-hold capacitor 501 is charged to a voltage representative of the blood level in the oxygenator. Therefore, in initial operation, the operator depresses pushbutton 14 and observes "ready" indicator 110. He continues to depress pushbutton 14 until indicator 110 illuminates, at which time he releases the pushbutton, and the invention is initialized and ready to operate. Of course, the "ready" indicator 110 also operates in conjunction with the automatic charging circuits hereinbefore described.

INDICATOR AND ALARM DRIVING CIRCUITS

Figure 6:
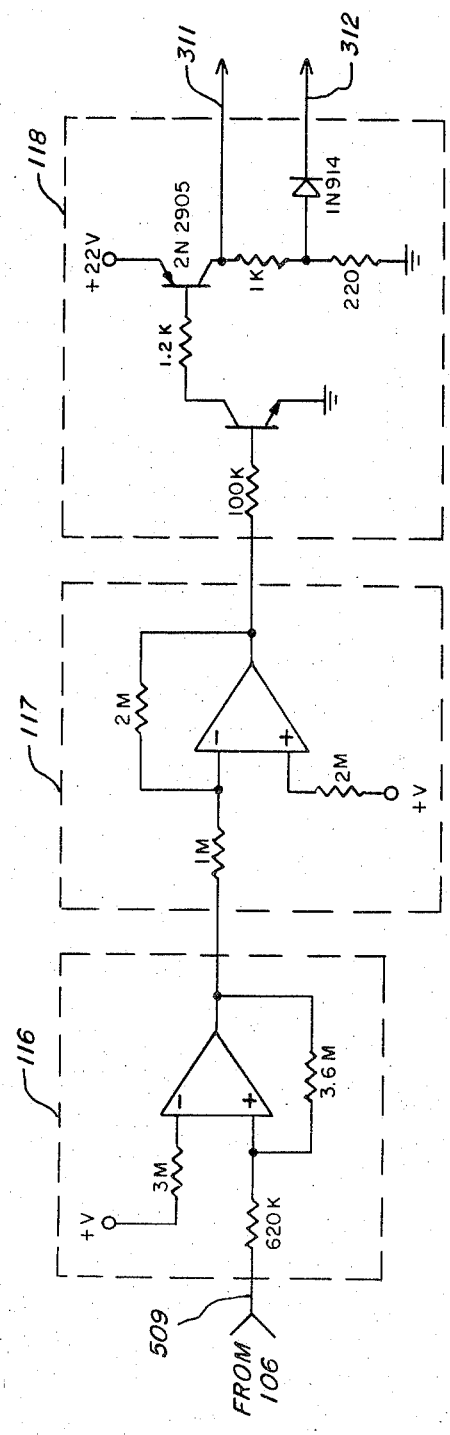
FIG. 6 shows the indicator and alarm driving circuits.

The indicator and alarm driving circuits 12 (FIG. 1) are illustrated in greater detail in FIG. 6. These circuits function to respond to the output of comparator 106 to drive the alarms associated with channel 1. Similar circuits exist for channels 2 and 3, although their output driving signals are connected in a slightly different manner.

Threshold circuit 116 is a Schmidt trigger circuit, responsive to an input signal on line 509. Circuit 116 is similar in operation to circuit 111, except that it is designed to be insensitive to small variations in input signal voltage. Therefore, circuit 116 will ignore voltage variations due to noise and other spurious causes and will generate a switching signal only when the signal on line 509 becomes significantly large. Circuit 116 is intended to recognize only substantial voltage changes, as would be present when the blood level has dropped completely below the position of the sensor associated therewith. When this occurs, threshold circuit 116 generates a signal into inverting amplifier 117 which in turn activates power amplifier 118. Power amplifier 118 has two voltage outputs: a voltage of approximately +22 volts placed on output line 311, and a voltage of approximately +4 volts placed on output 312. Output lines 311 and 312 are connected to suitable alarm means which will be hereinafter discussed.

ALARM CIRCUITS

Figure 7:
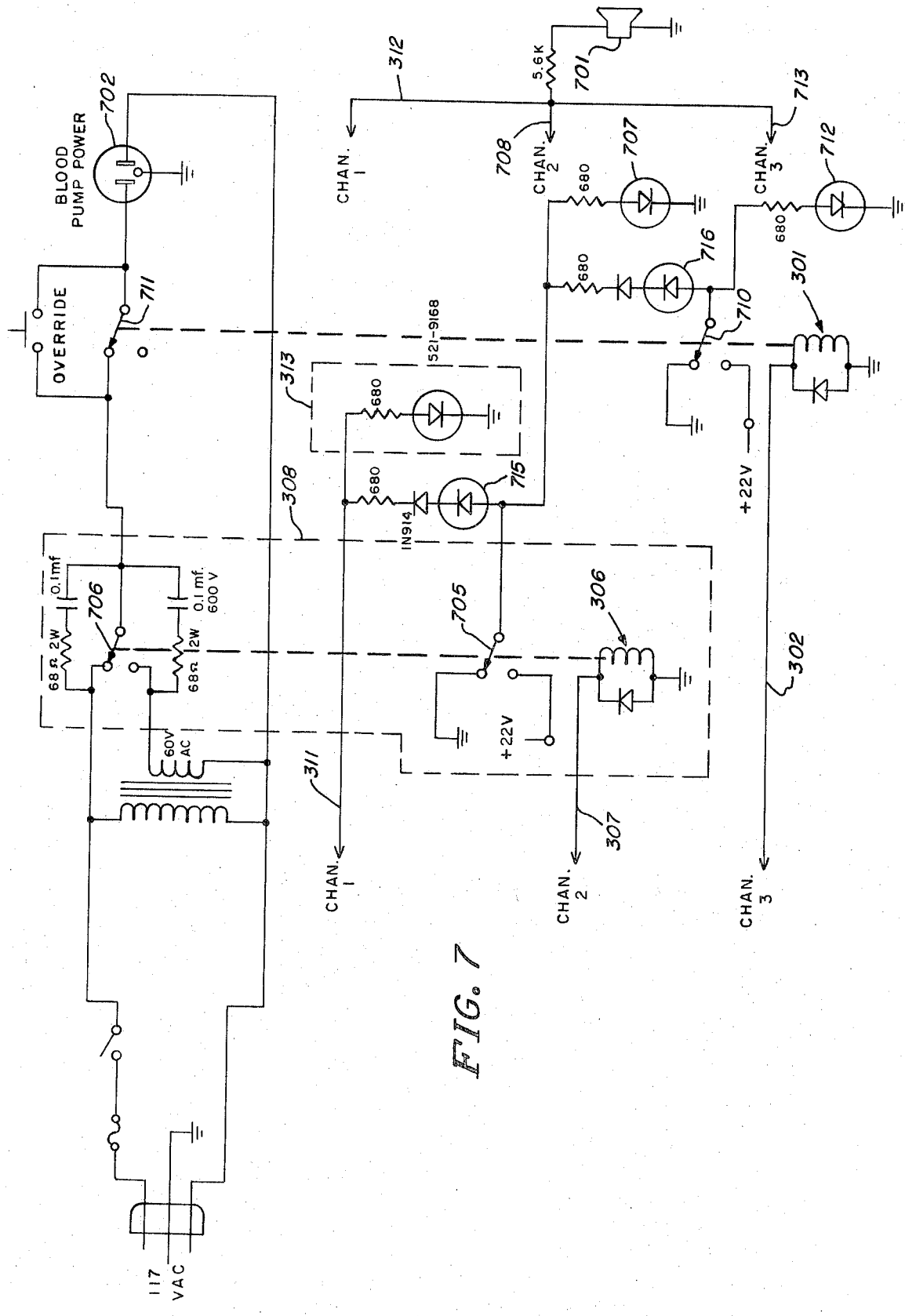
FIG. 7 illustrates the alarm means used with the invention.

FIG. 7 illustrates the alarm circuit 15 which forms a part of this invention. The alarm circuits function to activate certain light indicators and an audible alarm 701, and to control the power source for the blood pump (not shown). The blood pump is plugged into power socket 702, and the voltage available at power socket 702 is controlled by the alarm circuit. Since the alarm indication on each of the three channels results from different alarm conditions, each of the channels will be separately described.

A channel 1 alarm indication, as hereinbefore described, results in the placing of a +22 volt potential on line 311 and a +4 volt potential on line 312. The voltage on line 312 is connected to audible alarm 701 and results in this alarm becoming activated. Audible alarm 701 is typically a low voltage buzzer, of a type available commercially. The voltage on line 311 is connected to illumination means 313 which is typically a series connected resistor and light-emitting diode. The voltage on line 311 causes this diode to illuminate, thus providing a visual alarm.

The channel 2 alarm line corresponding to channel 1 alarm line 311 is line 307. A channel 2 alarm results in a +22 volts being applied to line 307, activating alarm circuitry 308. This circuitry consists of a relay 306 which becomes energized, activating relay contacts 705 and 706. Relay contact 705 connects a +22 volt power source to channel 2 alarm indicator 707. Relay contact 706, when activated, connects a 60 volt AC power source to the blood pump power socket 702. When relay contact 706 is not activated it connects the normal AC power line to the blood pump power socket 702. The channel 2 alarm line 708, corresponding to the channel 1 line 312, also connects to the audible alarm 701. Therefore, a channel 2 alarm signal results in an audible alarm, a light indication via light 707, and a reduced AC voltage being applied to the blood pump. This reduced voltage causes the blood pump to slow to half speed, thereby reducing the flow rate of blood from the oxygenator back into the patient's arteries.

When a channel 3 alarm condition exists, +22 volts is applied to line 302; this activates relay 301, moving relay contacts 710 and 711. Relay contact 701 applies a +22 volt potential to channel 3 alarm indicator 712. Relay contact 711 disconnects the AC power source from the blood pump power socket 702, thereby stopping the blood pump. Similarly to channels 1 and 2, a further alarm line 713 is connected to activate audible alarm 701. Therefore, a channel 3 alarm results in the illumination of an alarm indicator, activation of an audible alarm, and disconnecting the blood pump power.

In addition to the foregoing alarm devices, several self-checking alarm circuits are provided in the invention. For example, under normal operating conditions channel 1 always becomes activated first and remains activated after the channel 2 alarm is activated. Similarly, channels 1 and 2 are always activated before channel 3 alarms become activated. If, because of some circuit malfunction, this order is not preserved, malfunction indicators are illuminated to warn of the malfunction. If channel 2 becomes activated and channel 1 is not active, relay contact 705 connects a +22 volts to alarm indicator 715; this alarm indicator is suitably labeled on the control panel to alert the operator that an equipment malfunction exists.

Likewise, if channel 3 indicates an alarm when channel 2 does not so indicate, relay contact 710 connects a +22 volts to alarm indicator 716. This alarm indicator is also suitably labeled so as to notify the operator of an equipment malfunction. Therefore, the invention provides a self-checking feature to ensure that it generates a suitable alarm to the operator whenever internal malfunctions result in activation of the several alarm lines in a non-sequential order.

While the foregoing description covers a preferred embodiment of the invention, it will be evident that departures therefrom may be made within the spirit and scope of the invention.

What is claimed is:

1. Apparatus for use with a blood oxygenator of the type having a transparent section enclosing the blood flow, wherein the level of blood in said section provides a measure of flow rate, comprising:
   a. a plurality of optical sensors affixed to the transparent section, each sensor having a light-emitting element and a light-responsive element;
   b. electronic circuit means for energizing said light-emitting elements and for connecting to said light-responsive element for converting received light signals into voltage signals;
   c. a voltage memory circuit switchably coupled to each of said sensors, said memory circuit having means for storing a predetermined voltage level representative of a first sensed blood level, and means of providing said voltage level at an output terminal;
   d. a voltage comparison circuit connected to each of said electronic circuit means for converting light signals and to said voltage memory circuit output terminal, said comparison circuit having an output signal representative of the difference between said electronic circuit means voltage signals and said memory voltage;
   e. trigger circuit means connected to said voltage comparison circuit output and responsive to predetermined difference voltage levels, for generating an output signal when said difference voltage levels exceed a predetermined value; and
   f. alarm means connected to said trigger circuit output, for providing an alarm indication in response to said trigger circuit output signals.

2. The apparatus as claimed in claim 1 wherein said alarm means further comprises means for controlling said blood flow in response to said trigger circuit output signals.

3. The apparatus as claimed in claim 1 wherein said alarm means further comprises an audible and visual alarm associated with one of said sensors, means for adjusting said blood flow rate associated with a second of said sensors, and means for stopping said blood flow rate associated with a third of said sensors.

4. The apparatus as claimed in claim 3, wherein each of said sensors are positioned against said transparent section at respective different blood level positions.

5. The apparatus as claimed in claim 4 wherein said alarm means further comprises alarm indicators representative of equipment malfunctions, and means for activating said alarm indicators when alarm means associated with lower positioned sensors become activated without activation of alarm means associated with higher positioned sensors.

6. The apparatus as claimed in claim 2 wherein said voltage memory circuit further comprises means for introducing an initial voltage level into said voltage memory, and periodic voltage charging means connected to said voltage memory for updating said memory voltage at a rate substantially equal to the rate of decay of said memory voltage.

7. The apparatus as claimed in claim 6 wherein said electronic circuit means for energizing said light-emitting elements further comprises a pulse generator connected to said elements, said pulse generator providing a frequency driving signal to said elements.

8. Apparatus as claimed in claim 6 wherein each of said optical sensors further comprise two light emitting diodes, each positioned to direct light toward said transparent section at an angle of substantially 65° relative to said transparent section surface, and said light responsive element is positioned intermediate said light emitting diodes.

9. The apparatus as claimed in claim 8 wherein said light emitting diodes emit light having a substantially energy component at a wavelength of 9,000 Angstroms.

10. An apparatus for monitoring blood level in a blood oxygenator having at least one transparent wall in a region where blood level rises and falls with blood flow rate through said oxygenator, comprising:
   a. first, second, and third sensor elements positioned at respective different blood level positions on said exterior transparent surface, each of said sensors comprising a light emitting element directed inwardly toward said transparent surface and a light responsive element directed to receive light reflected from blood on the interior of said transparent surface;
   b. first, second, and third electronic circuit channels, each connected to respective ones of said sensor elements and comprising means for energizing said light emitting elements, and means for receiving signals from said light responsive elements, and means for developing and storing a voltage representative of the light responsive element signal reflected from blood, and means for comparing received signals from said light responsive elements with said stored voltage and generating a difference signal, and means for receiving said difference signal and generating a trigger signal when said difference signal exceeds a predetermined threshold value; and
   c. alarm circuit means, connected to each of said trigger signal generating means, for activating alarms in response to said trigger signals.

11. Apparatus as claimed in claim 10, wherein said sensor light emitting element further comprising two light-emitting semiconductor devices spaced apart and angled inwardly at an angle relative to said transparent surface of substantially 65°.

12. Apparatus as claimed in claim 11 wherein said sensor light responsive element is positioned intermediate said light-emitting semiconductor devices.

13. Apparatus as claimed in claim 10 wherein said means for energizing said light emitting element further comprises a frequency pulse generator and amplifier connected to said elements for generating light pulses at a fixed frequency.

14. Apparatus as claimed in claim 13 wherein said pulse generator frequency is approximately 1,000 hz.

15. Apparatus as claimed in claim 12 wherein said light emitting semiconductor devices emit a substantial light energy component at a wavelength of 9,000 Angstroms.

16. Apparatus as claimed in claim 13 wherein said means for receiving signals from said light responsive element further comprises a voltage amplifier connected to said light responsive element, and an integrating circuit connected to said voltage amplifier, said integrating circuit functioning to integrate the peak voltage amplitudes of received signals to provide a time-varying d.c. voltage at an integrator output.

17. Apparatus as claimed in claim 16 wherein said means for comparing received signals further comprises a differential amplifier having a first input connected to said integrator output and a second input connected to said means for developing and storing a voltage, and having an output terminal with a voltage thereon representative of the difference between the first and second input signals.

18. Apparatus as claimed in claim 17 wherein said means for developing and storing a voltage representative of the light responsive element signal reflected from blood further comprises a sample and hold circuit having a capacitor for storing said voltage, said capacitor being connected to said differential amplifier second input, and having a pulse generator and amplifier connected to said capacitor for periodically adding an incremental voltage charge to said capacitor, and having a switching circuit connected between said differential amplifier output terminal and said pulse generator output, said switching circuit being responsive to small voltage changes on said differential amplifier output to disable said pulse generator output signal.

19. Apparatus as claimed in claim 18, further comprising a manual override switch connected to said pulse generator and amplifier and to a voltage source, whereby closing of said switch causes the voltage source to be amplified to said amplifier and thereby disable said pulse generator.

20. Apparatus as claimed in claim 19, further comprising a second comparator circuit having an input connected to said capacitor and an input connected to said integrator output, and a visual indicator means connected to said second comparator output, for providing a visual indication when signals on said second comparator inputs are equal.

21. Apparatus as claimed in claim 18, whrein said alarm circuit means further comprises a first alarm associated with said first channel, said first alarm having a visual and audible alarm device for indicating when said first channel trigger signal is generated, said first alarm being activated by said first channel trigger signal generating means.

22. Apparatus as claimed in claim 21, wherein said alarm circuit means further comprises a second alarm associated with said second channel, said second alarm having a visual and audible alarm means for indicating and having means for adjusting said blood flow rate, when said second channel trigger signal is generated, said second channel alarm being activated by said second channel trigger signal generating means.

23. Apparatus as claimed in claim 22, wherein said alarm circuit means further comprises a third alarm associated with said third channel, said third alarm having a visual and audible alarm means for indicating, and having means for stopping said blood flow rate, when said third channel trigger signal is generated, said third channel alarm being activated by said third channel trigger signal generating means.

* * * * *